United States Patent
Kashiwabara

Patent Number: 5,720,692
Date of Patent: Feb. 24, 1998

[54] METHOD AND APPARATUS FOR CONTROLLING A CONTINUOUSLY VARIABLE TRANSMISSION

[75] Inventor: Masuo Kashiwabara, Atsugi, Japan

[73] Assignee: Unisia Jecs Corporation, Kanagawa-ken, Japan

[21] Appl. No.: 629,642

[22] Filed: Apr. 9, 1996

[30] Foreign Application Priority Data

Apr. 10, 1995 [JP] Japan .................. 7-084077

[51] Int. Cl.$^6$ ............................. F16H 61/00
[52] U.S. Cl. ..................... 477/45; 474/28; 477/46
[58] Field of Search ................... 477/45, 46, 48, 477/49; 474/18, 28

[56] References Cited

U.S. PATENT DOCUMENTS

| | | | |
|---|---|---|---|
| 4,642,069 | 2/1987 | Sawada et al. | 474/28 |
| 4,673,378 | 6/1987 | Tokoro et al. | 474/18 |
| 4,674,363 | 6/1987 | Miyawaki | 477/49 |
| 4,682,519 | 7/1987 | Okada et al. | 477/48 |
| 4,708,031 | 11/1987 | Morimoto et al. | 477/49 |
| 4,747,327 | 5/1988 | Itoh et al. | 477/45 |
| 4,759,236 | 7/1988 | Tezuka et al. | 477/49 |
| 4,785,690 | 11/1988 | Yokoyama et al. | 477/45 |
| 4,846,765 | 7/1989 | Sakai | 474/28 |
| 4,858,497 | 8/1989 | Kouno | 477/48 |
| 4,881,925 | 11/1989 | Hattori | 474/18 |
| 4,962,678 | 10/1990 | Murano et al. | 477/45 |

FOREIGN PATENT DOCUMENTS

| | | |
|---|---|---|
| 63-661 | 1/1988 | Japan . |
| 5-50615 | 7/1993 | Japan . |

*Primary Examiner*—Charles A. Marmor
*Assistant Examiner*—Peter T. Kwon
*Attorney, Agent, or Firm*—Lowe, Price, LeBlanc & Becker

[57] ABSTRACT

In order to optimize the speed change control of a continuously variable transmission, a necessary minimum primary pressure (Ppmin) for achieving a target speed change ratio is computed, and also a necessary minimum line pressure (Plmin) for the non occurrence of slippage between a secondary pulley 5 and a belt 6 is computed, and a required speed change ratio line pressure (Plratio) which can realize a target speed change ratio without slippage on the primary pulley 4 side is computed. The highest of these is then selected. The selected line pressure (Pl base) is then corrected by a transition line pressure (Pl add) determined from engine torque ($TQ_{ENG}$) and speed change speed (SV), to obtain a final output line pressure (Plprs) which is then used to control a secondary pulley actuator 5a. In this way, speed change control can be optimized, for example by controlling slipping of the belt 6 at the time of rapid speed change.

14 Claims, 18 Drawing Sheets

FIG. 13
(1) PRIMARY MINIMUM PRESSURE (Ppmin) COMPUTATION
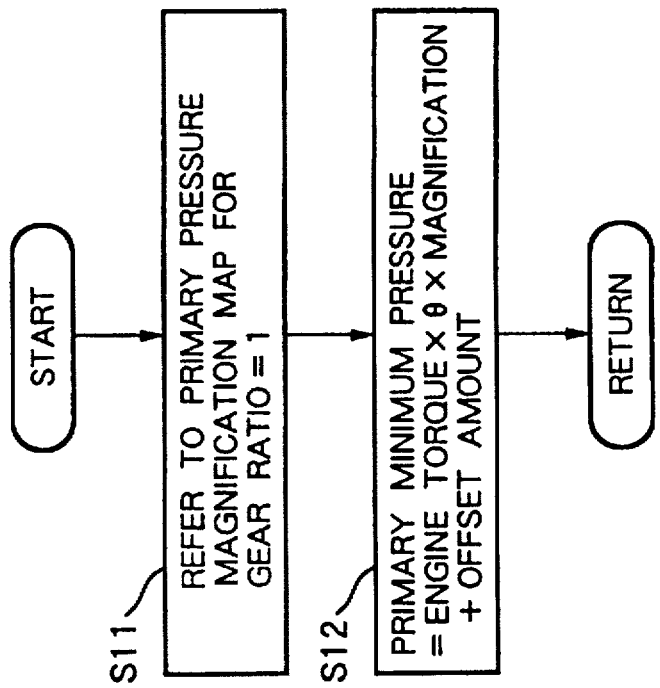
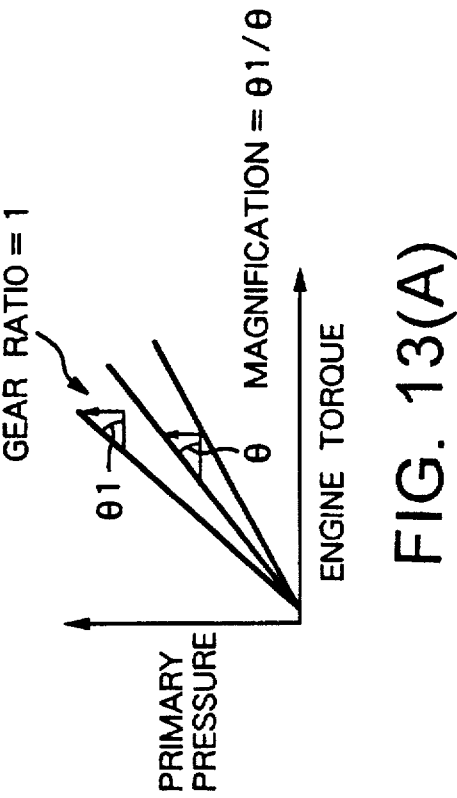
FIG. 13(A)

FIG. 14
(2) MINIMUM LINE PRESSURE (Plmin) COMPUTATION
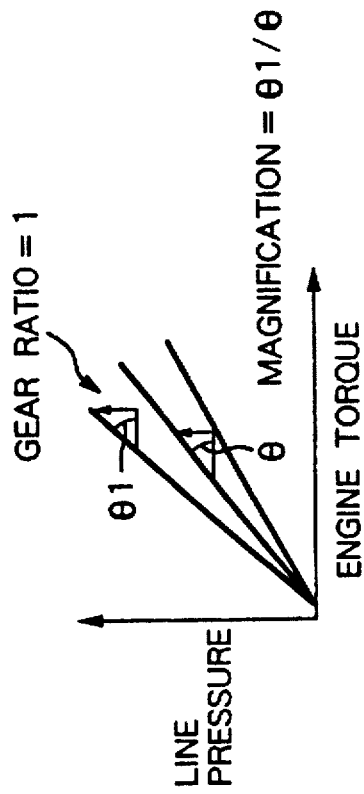
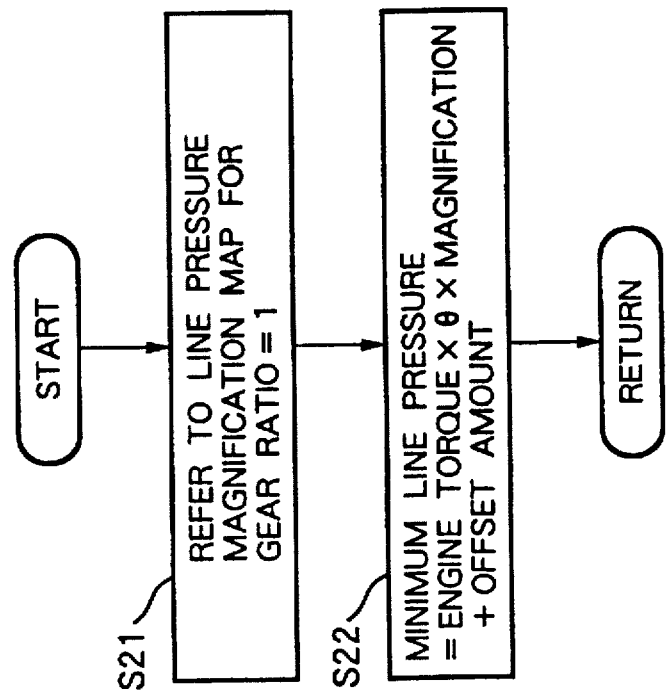
FIG. 14(A)

(3) REQUIRED SECONDARY FORCE (FS) COMPUTATION (4) REQUIRED SPEED CHANGE RATIO LINE PRESSURE (Plratio) COMPUTATION (5) BASIC LINE PRESSURE (Pl base) COMPUTATION (6) SECONDARY CENTRIFUGAL OIL PRESSURE (Pscen) COMPUTATION (7) TRANSITION LINE PRESSURE (Pladd) COMPUTATION

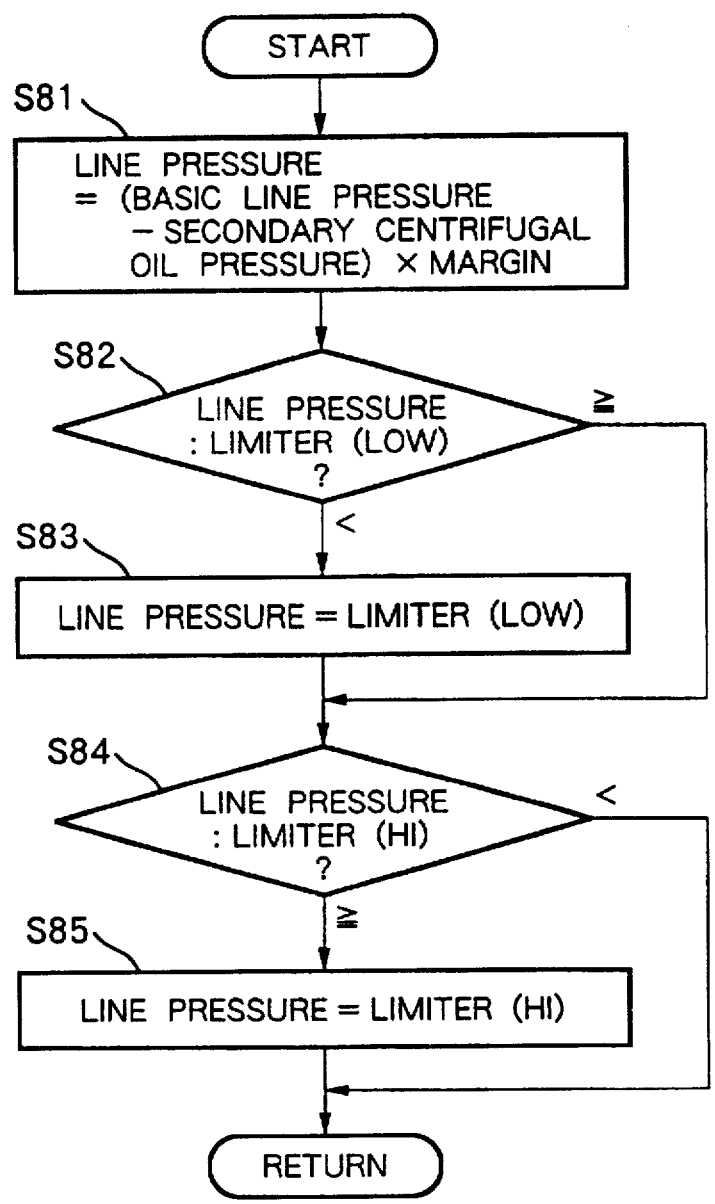

METHOD AND APPARATUS FOR CONTROLLING A CONTINUOUSLY VARIABLE TRANSMISSION

BACKGROUND OF THE INVENTION

(1) Field of the Invention

The present invention relates to technology for improving methods and apparatus for controlling a continuously variable transmission which is provided for example between a drive source (engine and the like) and a drive shaft.

(2) Description of the Related Art

In general with a speed change control apparatus for a continuously variable transmission (CVT) provided with two pulleys with effective diameters which can be continuously changed, and a belt connecting between the two pulleys, with a line pressure supplied to an actuator of one of he pulleys, and an oil pressure (oil quantity) which is adjusted to a predetermined pressure with the line pressure as a reference pressure by means of a speed change control valve in order to control speed change, supplied to the actuator of the other pulley to thereby carry out continuously variable speed change, it is common to set the line pressure so as to satisfy the following requirements.
That is to say:

(1) So that the belt does not slip.→(line pressure preferably high)

(2) So that there is not a reduction in life of the various parts due to excessive belt tension, and so that rotating friction is not excessive.→(line pressure preferably low)

(3) So as not to incur a deterioration in fuel consumption due to oil pump losses.→(line pressure preferably low)

Furthermore, so that the belt does not slip during speed change transition, for example at the time of a downshift, then a corresponding appropriate oil pressure must be applied at this time. A method wherein at the time of speed change transition a line pressure is temporarily increased, is disclosed for example in Japanese Examined Patent Publication Nos. 63-661 and 5-50615.

However with regards to concrete examples of how much increase in the oil pressure is acceptable at the time of speed change transition, Japanese Examined Patent Publication No. 63-661, only discloses on/off (two stage) switching of the line pressure by means of a solenoid valve, while Japanese Examined Patent Publication No. 5-50615 makes no disclosure at all, and in neither of these is there an attempt to optimize the line pressure supply at the time of speed change transition based on the above requirements (1)–(3).

SUMMARY OF THE INVENTION

The present invention takes into consideration the above-mentioned situation with the conventional arrangement, with the object of providing a method and apparatus for controlling a continuously variable transmission which can positively prevent slipping of the drive transmission member (for example a belt) at the time of speed change transition and which can supply a necessary and sufficient line pressure so that there is not a reduction in fife of the continuously variable transmission and so as not to incur a deterioration in fuel consumption and the like. Moreover it is an object of the invention to improve the accuracy of the abovementioned control method and apparatus.

Therefore with the method and apparatus according to the present invention for controlling a continuously variable transmission comprising a drive side rotating member which receives a rotation force from a drive source, a driven side rotating member, and a drive transmission member disposed therebetween for transmitting drive between both members, with a speed change ratio between the drive side rotating member and the driven side rotating member able to be steplessly set by steplessly changing a drive side contact radius (a distance of a contact position of the drive side rotating member and the drive transmission member from the rotation axis), and a driven side contact radius (a distance of a contact position of the driven side rotating member and the drive transmission member from the rotation axis) relative to each other, the construction is such that when a rapid speed change is detected, a line pressure which presses the driven side rotating member against the drive transmission member is controlled to increase temporarily so as to temporarily increase a contact pressure between the drive transmission member and the drive side rotating member or the driven side rotating member, so that slipping does not occur between the drive transmission member and the drive side rotating member or the driven side rotating member, and is also such that the temporarily increased line pressure can be set higher in accordance with an increase in the input torque which is input to the drive side rotating member.

With such a construction, the amount of increase in the temporarily increased line pressure can be set to correspond to the magnitude of the input torque which is strongly correlated with the ease of slipping of the drive transmission member. Hence slipping of the drive transmission member (for example a belt) can be positively prevented, even at the time of speed change transition (in particular at the time of rapid speed change), and a necessary and sufficient line pressure can be supplied so that there is no reduction in life of the continuously variable transmission end an increase in the rotation friction is also suppressed, and so as not to incur a deterioration in fuel consumption due to oil pump losses and the like. Therefore good control of the continuously variable transmission can be achieved.

The construction may also be such that the temporarily increased line pressure is set higher the faster the speed change speed.

In this way, the amount of increase in the temporarily increased line pressure can be set to correspond to the magnitude of the speed change speed which is strongly correlated with the ease of slipping of the drive transmission member. Hence slipping of the drive transmission member can be positively prevented, even at the time of speed change transition, and a necessary and sufficient line pressure can be supplied so that there is no reduction in life of the continuously variable transmission and an increase in the rotation friction is also suppressed, and so as not to Incur a deterioration in fuel consumption due to oil pump losses and the like. Therefore good control of the continuously variable transmission can be achieved.

Moreover, the construction may be such that the temporarily increased line pressure is set higher in accordance with an increase in the input torque which is input to the drive side rotating member, and the faster the speed change speed.

In this way, if the temporarily increased line pressure is set so as to increase the higher the input torque and the faster the speed change speed, then the correlation of the line pressure setting with the ease of slipping of the drive transmission member, can be made even stronger. Consequently the slipping of the drive transmission member at the time of speed change transition can be even more positively prevented, and a necessary and sufficient line pressure can be supplied so that there is no reduction in life of the continuously variable transmission, and so that an increase in the rotation friction can be suppressed, and so as not to incur a deterioration in fuel consumption due to oil pump losses and the like. Therefore optimum control of the continuously variable transmission can be achieved.

Furthermore, the construction may be such that when the resultant output line pressure is equal to or above a predetermined value, the speed change speed is controlled to below or equal to a predetermined value, by controlling the relative change speed of the drive side contact radius and the driven side contact radius.

With such a construction, when the resultant output line pressure is equal to or above a predetermined value, the speed change speed can be controlled to below or equal to a predetermined value by controlling the relative change speed of the drive side contact radius and the driven side contact radius. Therefore under conditions wherein the drive transmission member slips even with the line pressure increased, an increase in the line pressure to more an necessary can be prevented by lowering the speed change speed and hence reducing the required line pressure. Consequently, the problem with the reduction in life of the continuously variable transmission with the increase in rotation friction, and the deterioration in fuel consumption and the like due to oil pump losses can be avoided.

Now the construction may be such that the drive side rotating member is a pulley with a changeable effective wrapping diameter, the driven side rotating member is a pulley with a changeable effective wrapping diameter, and the drive transmission member is a wrapping type transmission medium for wrapping around these.

With such a construction, the present invention becomes applicable to so called movable pulley type continuously variable transmissions adopted in practice in vehicles and the like, and can thus be advantageous from the point of view of cost reduction, commonality of parts, endurance, maintenance and so on.

Further objects end aspects of the present invention will become apparent from the following description of embodiments given in conjunction with the appended drawings.

BRIEF DESCRIPTION OF THE DRAWINGS

FIG. 13 is a flow chart for explaining block (1) in FIG. 12;

FIG. 13A is a map of relationships between "primary pressure" (Ppmin) and "engine torque" at different speed change ratios;

FIG. 14 is a flow chart for explaining block (2);

FIG. 14A is a map of relationships between "line pressure" and "engine torque" at different speed change ratios;

FIG. 20 is a flow chart for explaining block (8).

DESCRIPTION OF THE PREFERRED EMBODIMENTS

As follows is a description of the embodiments of the present invention.

Figure 1:
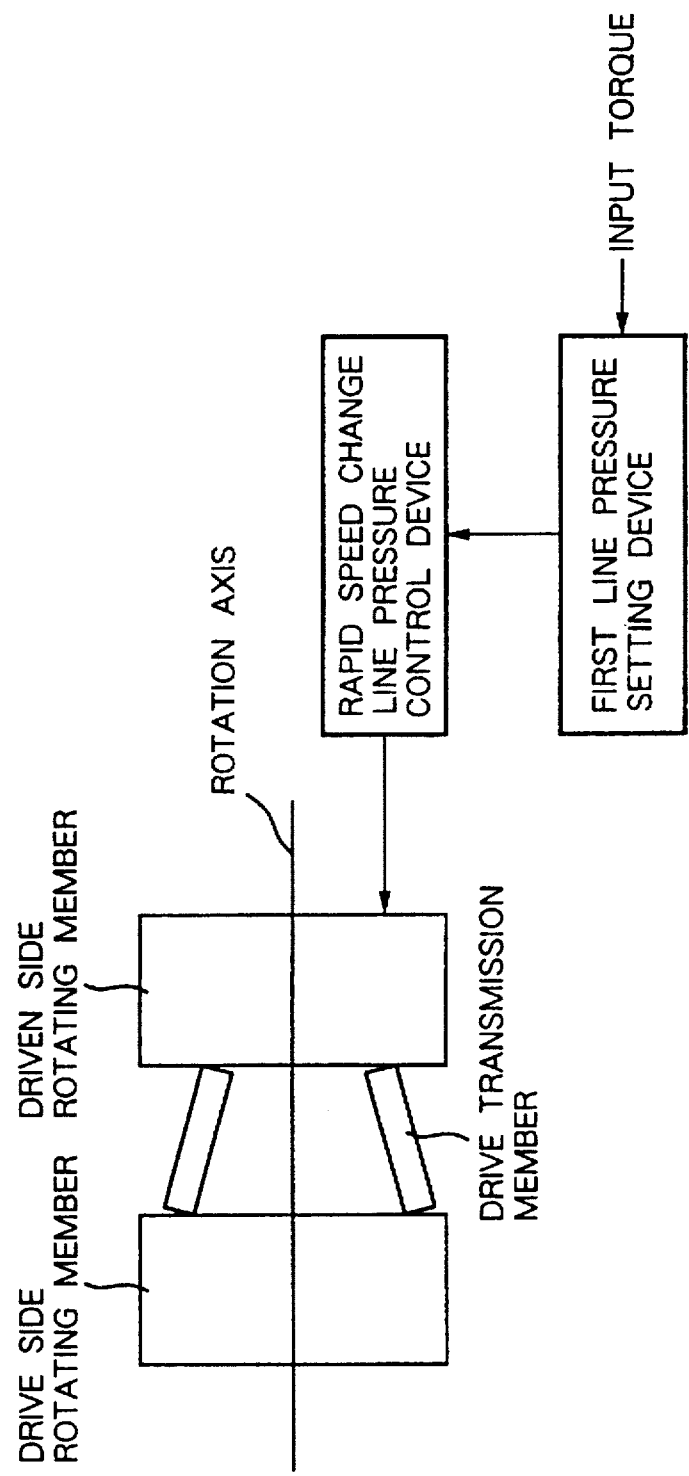
FIG. 1 is a structural diagram showing a control apparatus according to claim 1.
Figure 2:
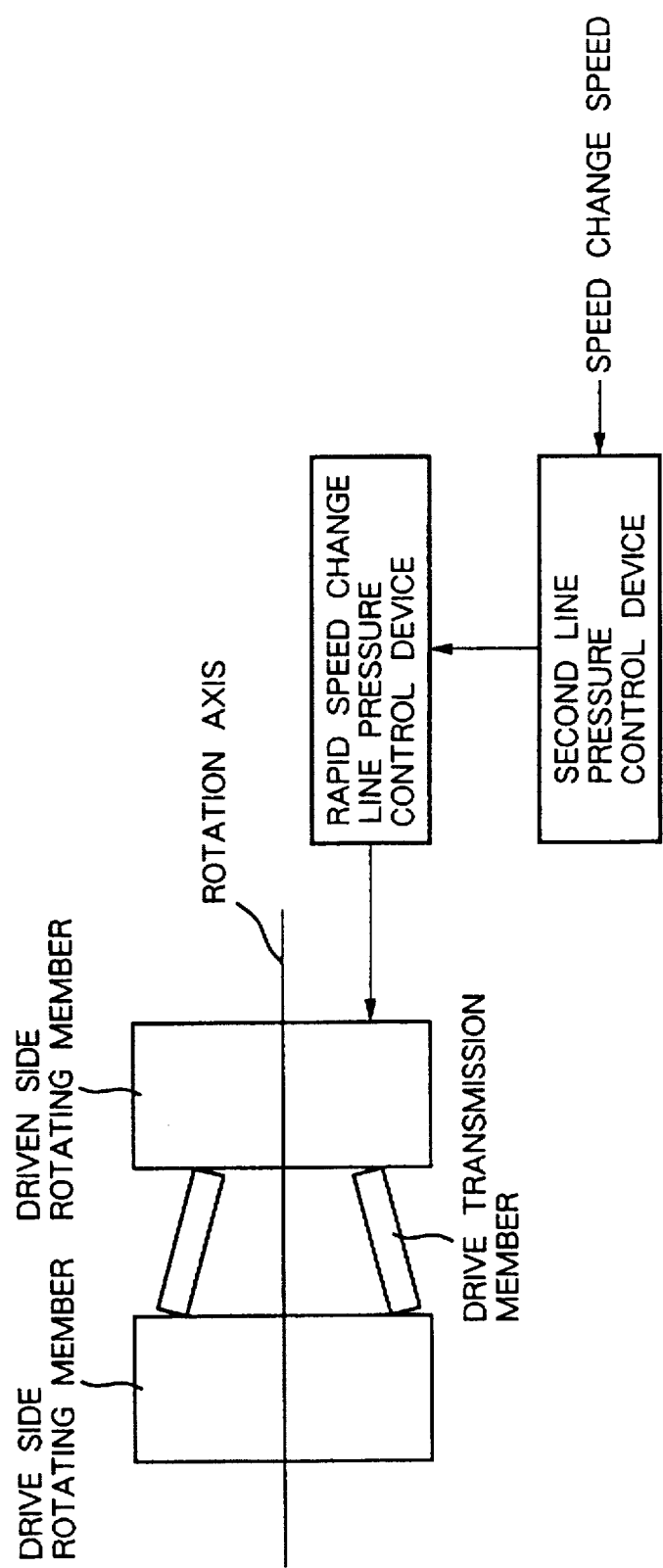
FIG. 2 is a structural diagram showing a control apparatus according to claim 2.
Figure 3:
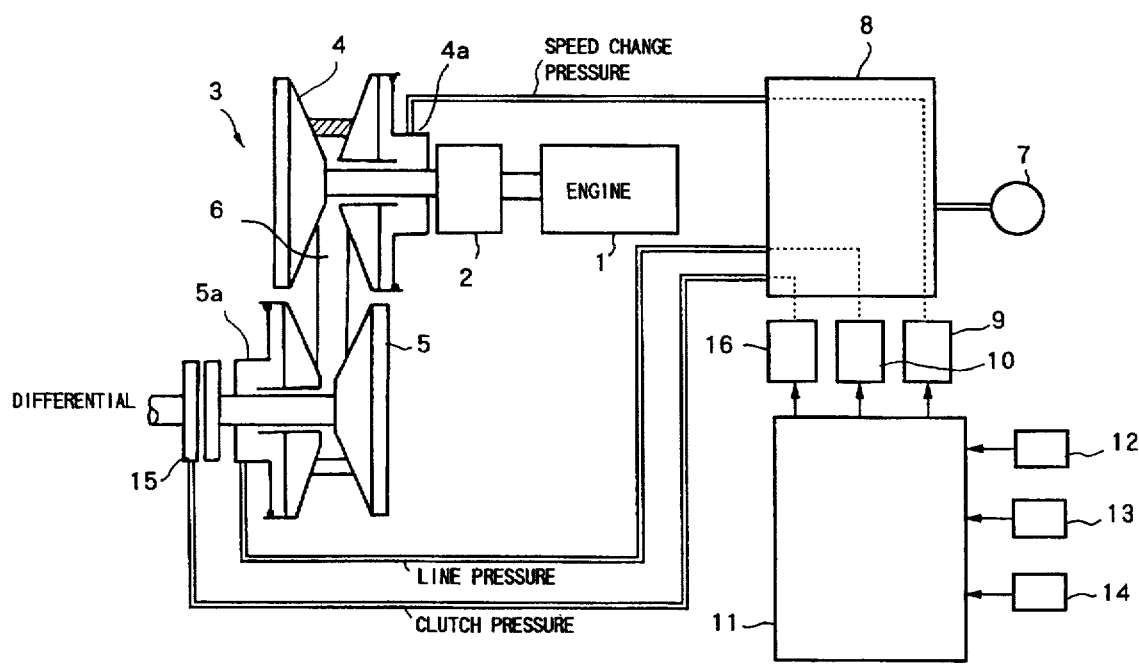
FIG. 3 is a system diagram showing an embodiment of the present invention.

FIG. 3 is a system diagram of a first embodiment.

The output side of an engine 1 is fitted with a continuously variable transmission (CVT) 3 via a known long travel damper (a spring type damper for absorbing rotation fluctuations) 2. The long travel damper 2 can be omitted in a method to be described later wherein a start clutch is disposed between the engine and the continuously variable transmission 3, or a method wherein a torque converter is disposed therebetween.

The continuously variable transmission (CVT) 3 is provided with a primary pulley 4 on the engine 1 side, a secondary pulley 5 on a drive shaft (differential) side, and a belt 6 made from synthetic rubber or metal or a combination of these, connecting therebetween. A pulley ratio (effective belt wrapping diameter of the secondary pulley/effective belt wrapping diameter of the primary pulley) is changed by adjusting a speed change pressure to primary pulley actuator 4a (speed change control oil pressure chamber) and a line pressure to a secondary pulley actuator 5a (tension control oil pressure chamber), so that the speed change ratio can be steplessly changed. However, another continuously variable transmission such as a known toroidal type CVT may be used. That is to say, the continuously variable transmission 3 is one comprising; a drive side rotating member which receives a rotation force from a drive source, a driven side rotating member, and a drive transmission member disposed therebetween, with a speed change ratio between the drive side rotating member and the driven side rotating member able to be steplessly set by steplessly changing a drive side contact radius (a distance of a contact position of the drive side rotating member and the drive transmission member from the rotation axis), and a driven side contact radius (a distance of a contact position of the driven side rotating member and the drive transmission member from the rotation axis) relative to each other. Here, the primary pulley 4 corresponds to the drive side rotating member, the secondary pulley 5 corresponds to the driven side rotating member, and the belt 6 corresponds to the drive transmission member (wrapping type transmission medium).

Furthermore, the hydraulic pressure for pressing the drive side rotating member against the drive transmission member, corresponds to the speed change pressure in the present embodiment. Moreover, the hydraulic pressure for pressing the driven side rotating member against the drive transmission member, corresponds to the line pressure in the present embodiment.

With the speed change pressure and the line pressure, the oil pressure inside the respective hydraulic lines (for example broken lines in FIG. 3) disposed inside a hydraulic circuit 8 connected to an oil pump 7, is regulated for example by the opening/closing of solenoid valves 9, 10 or the like which have a relief function, and by means of flow control valves for speed change pressure end line pressure control, disposed in the respective hydraulic lines. Drive control of the solenoid valves 9, 10 and the flow control valves is controlled by a controller 11.

More specifically, so as to achieve the required speed change ratio corresponding to running conditions and the like, the speed change pressure and line pressure are controlled by the controller 11 by means of the solenoid valves 9, 10 and the flow control valves, so that the speed change ratio is controlled to a target value. The construction may also be such that the solenoid valves 9, 10 and the flow control valves respectively comprise several solenoid valves, with the target speed change ratio and line pressure being achieved by opening/closing combinations of the several solenoid valves.

A start dutch 15 is disposed between an output side (secondary pulley 5) of the continuously variable transmission 3 and a drive shaft side (for example a differential), with a line pressure thereto controlled by a solenoid valve 16. The solenoid valve 16 also, is controlled by the controller 11. The controller has the function of a rapid speed change line pressure control step or device, a first line pressure setting step or device, a second line pressure setting step or device, and a speed change speed limiting step or device of the present invention.

For controlling the speed change ratio and the line pressure, respective detection signals are input to the controller 11 from sensors such as; an input side rotation sensor 12 for generating a pulse signal synchronized with the rotation of the input side (primary pulley 4) to detect an actual input rotational speed Nin (engine 3 rotational speed $N_E$) of the continuously variable transmission 3, an output side rotation sensor 13 for generating a pulse signal synchronised with the rotation of the output side (secondary pulley 5 to detect an actual output rotational speed $N_O$ of the continuously variable transmission 3, and a potentiometer type throttle sensor 14 which generates a voltage signal corresponding to the opening of a throttle valve (throttle valve opening TVO) of the engine 1. An engine rotation sensor and a vehicle speed sensor may be respectively used for the input side rotation sensor 12 and the output side rotation sensor 13.

Figure 4:
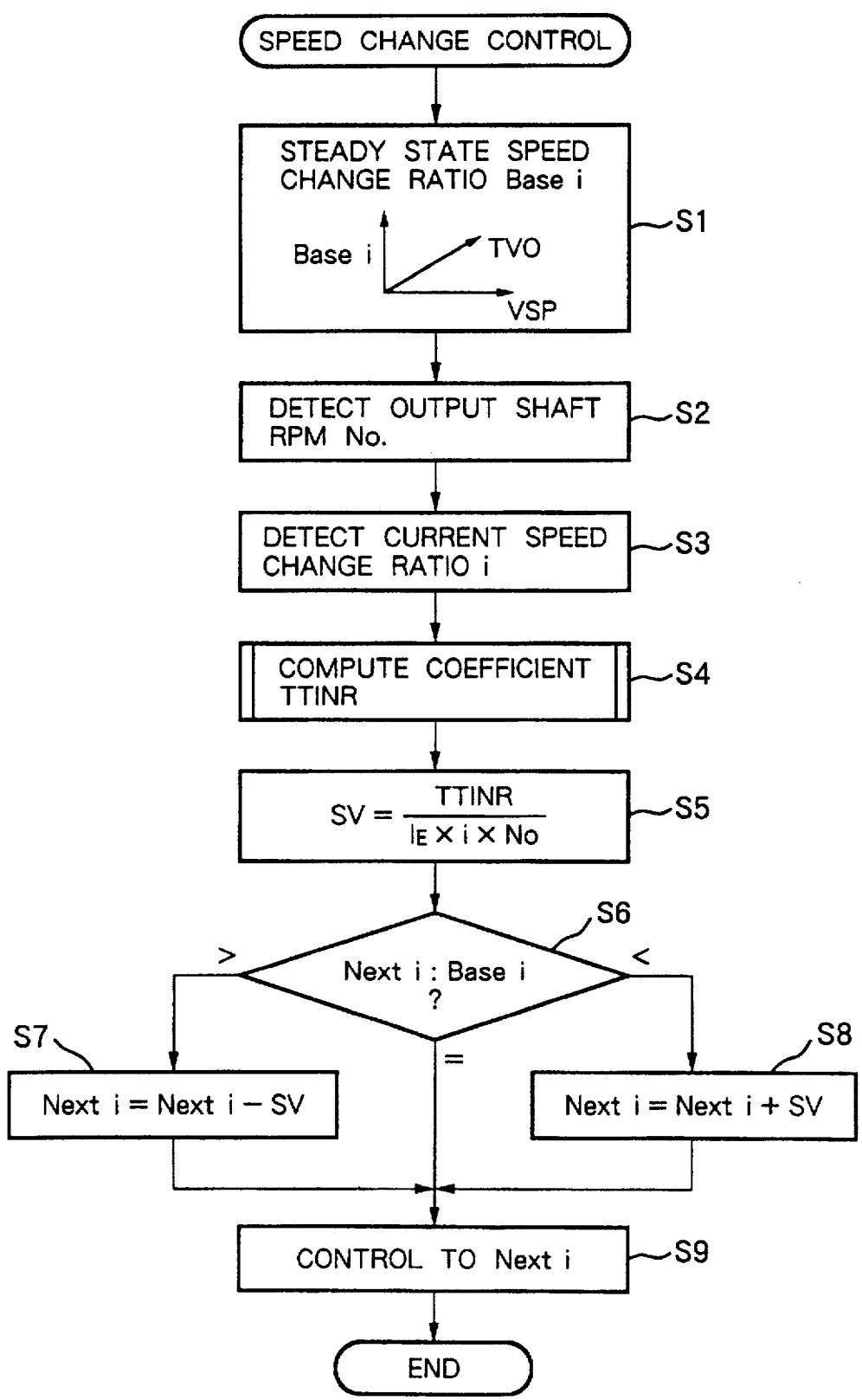
FIG. 4 is a flow chart for a speed change control routine of the embodiment.

FIG. 4 is a flow chart of a speed change control routine executed by the controller 11. This routine is executed once for each unit time.

In step 1 (with "step" denoted by S in the figures), a map prescribing a final target steady state speed change ratio Base i (final target speed change ratio; map speed change ratio), based on vehicle speed VSP and throttle valve opening TVO, is referred to end a speed change ratio Base i for the actual vehicle speed VSP and the throttle valve opening TVO read.

In step 2, the speed changer output shaft rotational speed $N_O$ is detected. This detection can be carded out by the vehicle speed sensor 12.

In step 3, a current speed change ratio i is detected. The speed change ratio i can be determined from the engine rotational speed $N_E$ (speed changer input shaft rotational speed) and the speed changer output shaft rotational speed $N_O$ as a ratio ($N_E/N_O$).

In step 4, a coefficient TTINR (approximating a target inertia torque) determined by the operating conditions is computed.

Figure 5:
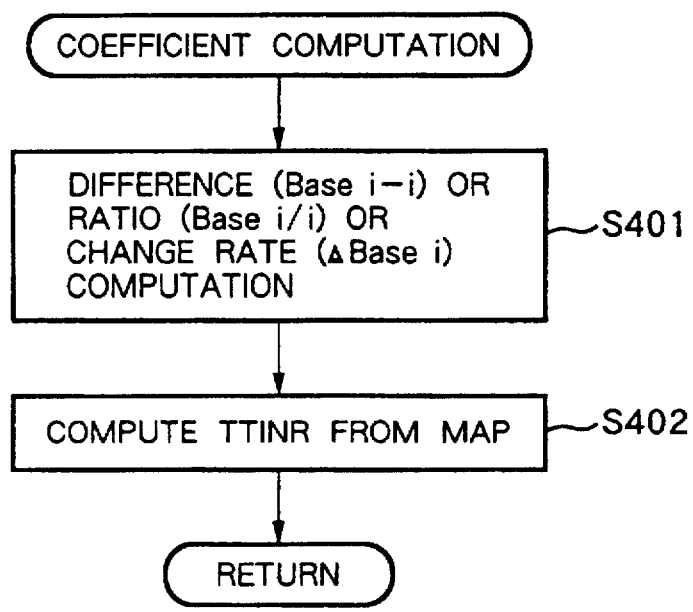
FIG. 5 is a flow chart of a subroutine (1) used in coefficient computation.
Figure 6:
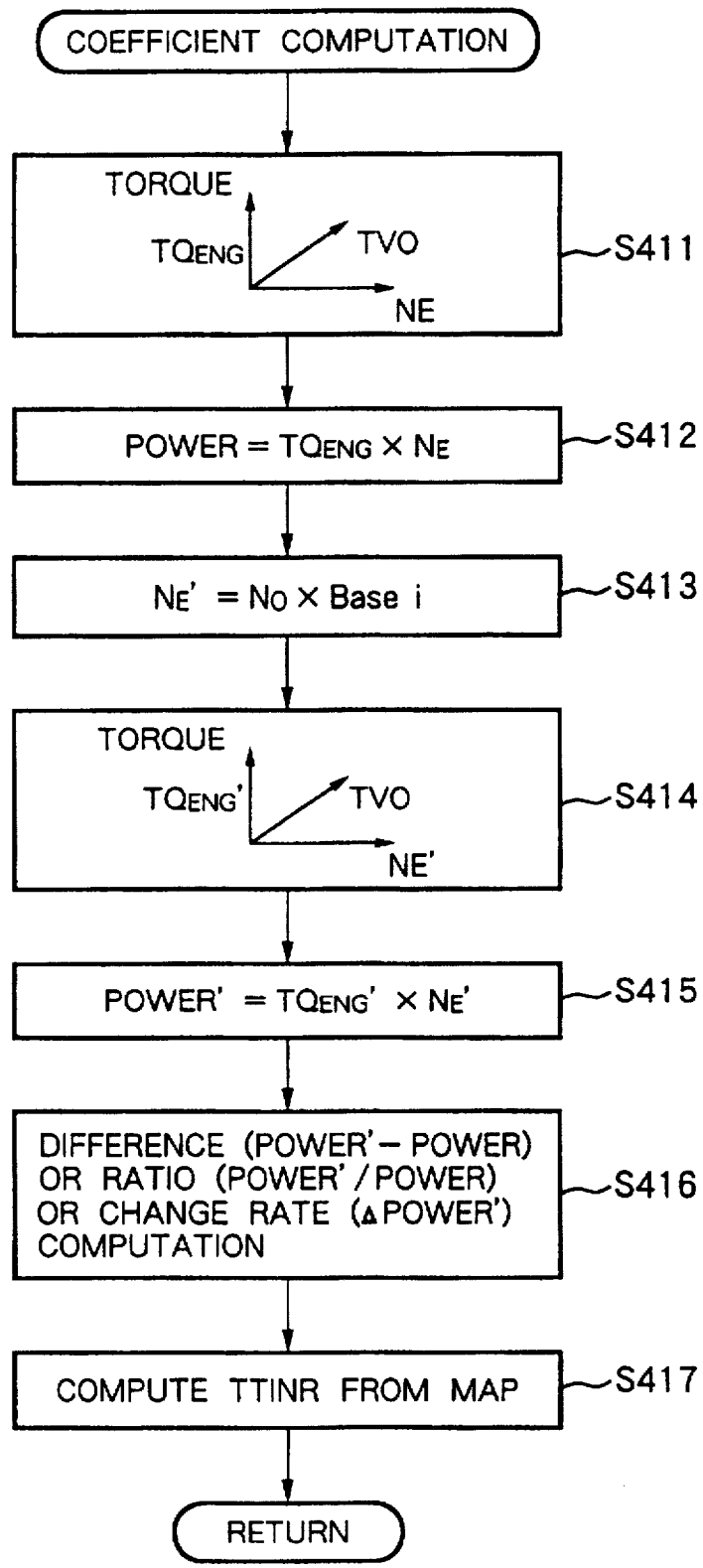
FIG. 6 is a flow chart of a subroutine (2) used in coefficient computation.
Figure 7:
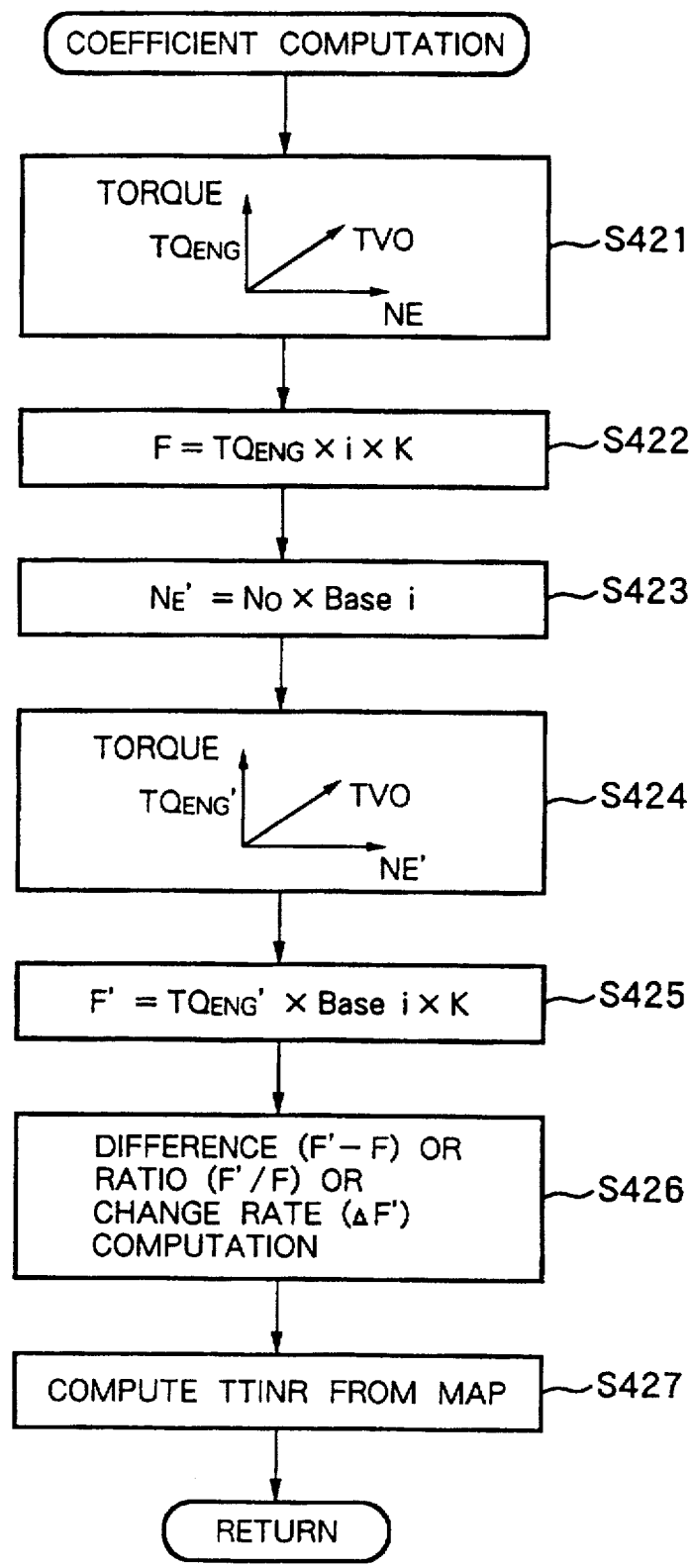
FIG. 7 is a flow chart of a subroutine (3) used in coefficient computation.

The computational method is by one of the methods shown in FIG. 5 through FIG. 7.

With the method of FIG. 5, at first in step 401, a difference between the steady state speed change ratio Base i and the current speed change ratio i |Base i–j| (absolute value), a ratio Base i/f, (or i/Base j), or a change rate ΔBase i of the steady state speed change ratio Base i (the absolute value of the change amount per unit time; the absolute value of the difference from the value computed in the previous routine) is computed. When the ratio is used, then i/Base i may be used at the time of up shift, and Base i/i may be used at the time of down shift.

Then in step 402, the coefficient TTINR is set by referring to the map of FIG. 8(A) in the case of the difference, the map of FIG. 8(B) in the case of the ratio, or the map of FIG. 8(C) in the case of the change rate. The characteristics of the map are made different for at the time of up shift and at the time of down shift.

With the method of FIG. 6, at first in step 411, the engine torque $TQ_{ENG}$ is computed from the engine rotational speed $N_E$ and the throttle valve opening TVO by reference to a map. Then in step 412, a current power POWER is computed from the engine torque $TQ_{ENG}$ and the engine rotational speed $N_E$ as, POWER=$TQ_{ENG} \times N_E$.

In step 413, a steady state engine rotational speed $N_E'$ is computed from the speed changer output shaft rotational speed $N_O$ and the steady state speed change ratio Base i as, $N_E'=N_O \times$Base i. Then, in step 414, a steady state engine torque $TQ_{ENG}'$ is computed from the steady state engine rotational speed $N_E'$ and the throttle valve opening TVO by reference to the map used in step 411. Then in step 415, a steady state power POWER' is computed from the steady state engine torque $TQ_{ENG}'$ and the steady state engine rotational speed $N_E'$ as, POWER'=$TQ_{ENG}' \times N_E'$.

After this in step 416, a difference between the steady state POWER' and the current POWER |POWER'–POWER| (absolute value), a ratio POWER'/POWER (or POWER/POWER'), or a change rate ΔPOWER' of the steady state power POWER (the absolute value of the change amount per unit time; the absolute value of the difference from the value computed in the previous routine) is computed.

Figure 8:
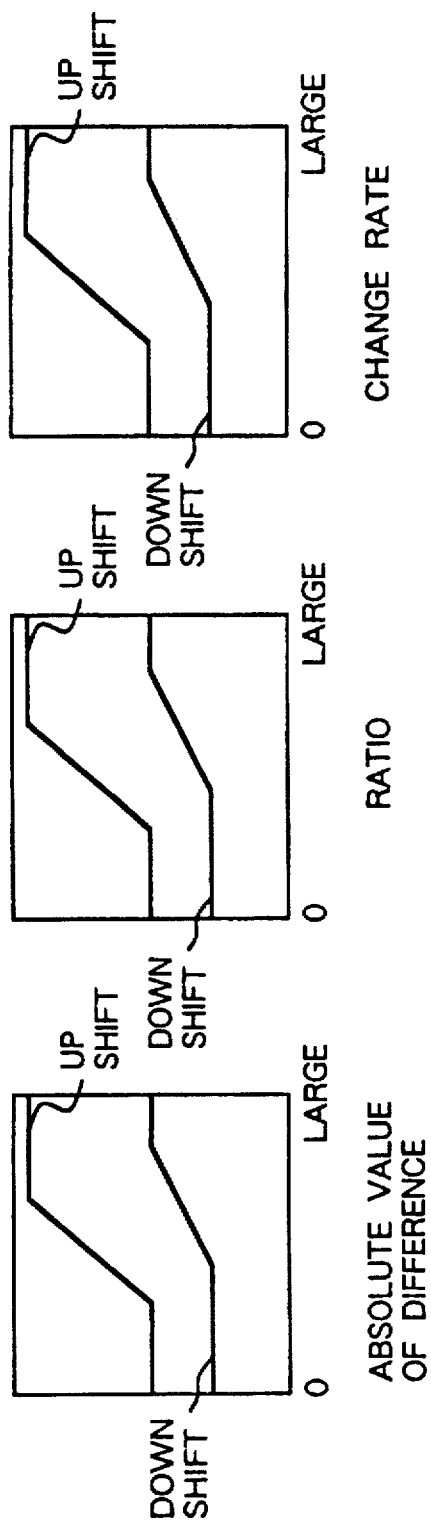
FIG. 8(A)–8(E) show maps used in coefficient computation.

Then In step 417, the coefficient TTINR is set by referring to the map of FIG. 8 (A) in tile case of the difference, the map of FIG. 8(B) in the case of the ratio, or the map of FIG. 8(C) in the case of the change rate.

With the method of FIG. 7, at first in step 421, the engine torque $TQ_{ENG}$ is computed from the engine rotational speed $N_E$ and the throttle valve opening TVO by reference to a map. Then in step 422, a current vehicle drive force F is computed from the engine torque $TQ_{ENG}$ and the current speed change ratio i and a predetermined constant K (a constant including tire diameter and differential characteristics) as, F=$TQ_{ENG} \times i \times K$, In step 423, a steady state engine rotational speed $N_E'$ is computed from the speed changer output shaft rotational speed $N_O$ and the steady state speed change ratio Base i as, $N_E'=N_O \times$Base i. Then, in step 424, a steady state engine torque $TQ_{ENG}'$ is computed from the steady state engine rotational speed $N_E'$ end the throttle valve opening TVO by reference to the map used in step 421. Then in step 425, a steady state vehicle drive force F' is computed from the steady state engine torque $TQ_{ENG}'$ and the steady state speed change ratio Base i, and the predetermined constant K as, $F'=TQ_{ENG}' \times Base\ i \times K$.

After this in step 426, a difference between the steady state vehicle drive force F' and the current vehicle drive force F|F'−F|(absolute value), a ratio F'/F (or F/F'), or a change rate ΔF' of the steady state vehicle drive force F' (the absolute value of the change amount per unit time; the absolute value of the difference from the value computed in the previous routine) is computed.

Then in step 427, the coefficient TTINR is set by referring to the map of FIG. 8(A) in the case of the difference, the map of FIG. 8(B) in the case of the ratio, or the map FIG. 8(C) in the case of the change rate.

Returning now with the description to FIG. 4.

In step 5 an increase/decrease component SV which determines the speed change speed, is set according to the following equation from the current speed change ratio i, the speed changer output shaft rotational speed $N_O$, and the coefficient TTINR:

$$SV=TTINR/(I_E \times i \times N_O)$$

where $I_E$ is a constant corresponding to engine inertia.

Figure 9:
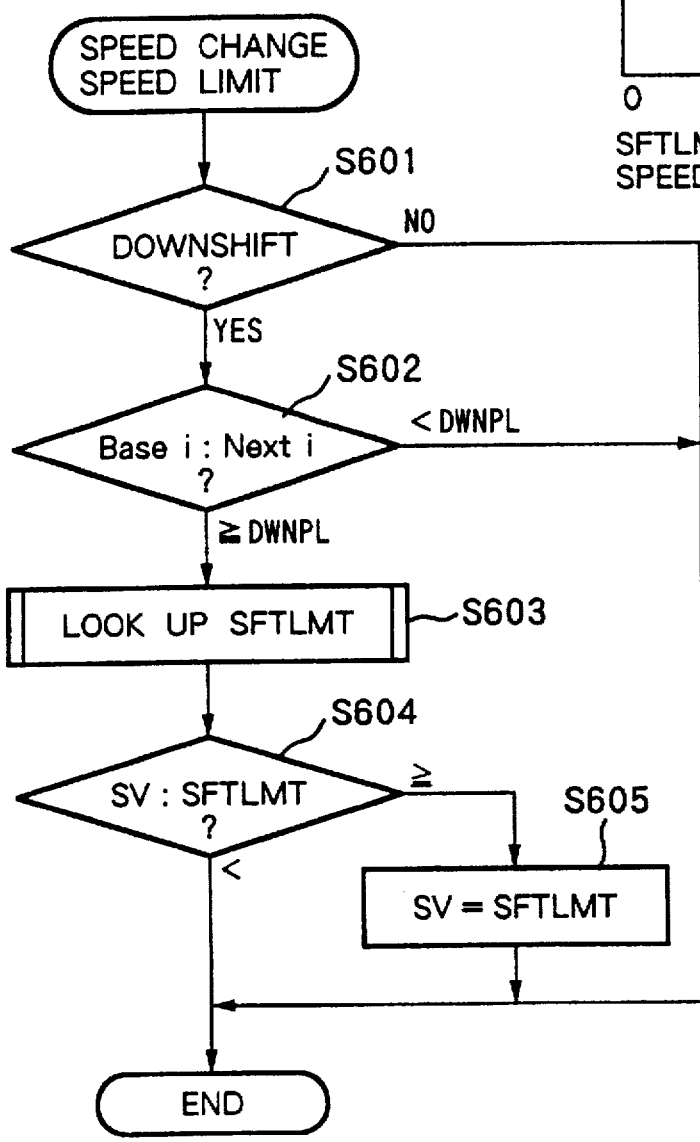
FIG. 9 is a flow chart of a subroutine for setting speed change limit value.
Figure 9A:
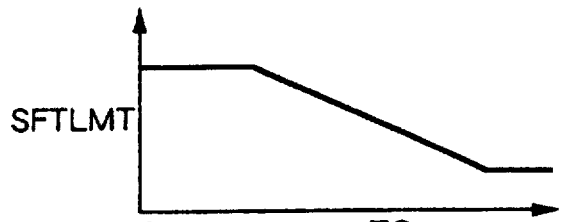
FIG. 9A is a map of a limit value SFTLMT plotted against engine torque $TQ_{ENG}$.

With the present embodiment as described later, an attempt is made to optimize the line pressure control corresponding to the speed change speed SV in order to positively prevent slipping of the belt 6 at the time of transitional speed change. However with this line pressure control, at the time of transitional speed change, the speed change speed SV must be controlled to below or equal to a predetermined value in order to exclude an extremely fast speed change condition where the belt slips even if the line pressure is raised equal to or above a predetermined value. Therefore in step 6, the subroutine as shown in FIG. 9 is executed. This subroutine constitutes a speed change speed limit step or device of the present invention.

With this subroutine, in step 601 it is judged if there is downshift. This judgement can be made for example by comparing the final target speed change ratio Base i with the speed change ratio i (when the routine is started).

If there is downshift, control proceeds to step 602 while if not, the routine is terminated In step 602, the speed change ratio Base i in the map and a current set speed change ratio Next i (target speed change ratio) are compared. If the difference (or ratio) is DWNPL or above, control proceeds to step 603, while if less than DWNPL, it is considered that slipping of belt 6 is unlikely since the speed change adjustment has progressed (the speed change ratio has come close to the target speed change ratio), and the speed change speed is thus set relatively slow. The routine is thus terminated.

In step 603, the map shown in the flow chart is referred to and a limit value SFTLMT for the speed change speed SV, which is set based on the engine torque $TQ_{ENG}$, is determined.

In step 604, the current speed change speed SV and the limit value SFTLMT are compared. If SV≧SFTLMT, then SV is set equal to SFTLMT, and the routine is terminated.

On the other hand, if SV<SFTLMT, then the routine terminated with SV=SV.

In this way, the speed change speed SV is limited to below or equal to the predetermined value SFTLMT set in accordance with engine torque (in accordance with the ease of slipping of belt 6). Hence at the time of speed change transition, the extremely fast speed change speed condition where the belt 6 slips even if the line pressure is raised equal to or above a predetermined value is excluded, so that the slipping of the belt 6 can be positively prevented.

Returning now with the description to FIG. 4.

In step 6, the current set speed change ratio Next i (target speed change ratio) and the final target steady state speed change ratio Base i (final target speed change ratio are compared to determine the size relationship.

If Next i>Base i, there is an up shift requirement (speed change ratio reduction requirement), and control proceeds to step 7.

In step 7, the set speed change ratio Next i (target speed change ratio) is reduced relative to the current value by the increase/decrease component SV (refer to the following equation).

Next i=Next i−SV

When Next i<Base i, there is a down shift requirement (speed change ratio increase requirement) and control proceeds to step 8.

In step 8, the set speed change ratio Next i (target speed change ratio) is increased relative to the current value by the increase/decrease component SV (refer to the following equation).

Next i=Next i+SV

Once the set speed change ratio Next i (target speed change ratio) has been set in this way, control proceeds to step 9.

In step 9 feedback control is carded out to obtain the set speed change ratio Next i (target speed change ratio). That is to say, speed change ratio control is carried out so that the current speed change ratio i detected as the ratio ($N_E/N_O$) of the engine rotational speed $N_E$ and the speed changer output shaft rotational speed $N_O$, becomes the set speed change ratio Next i.

Figure 10:
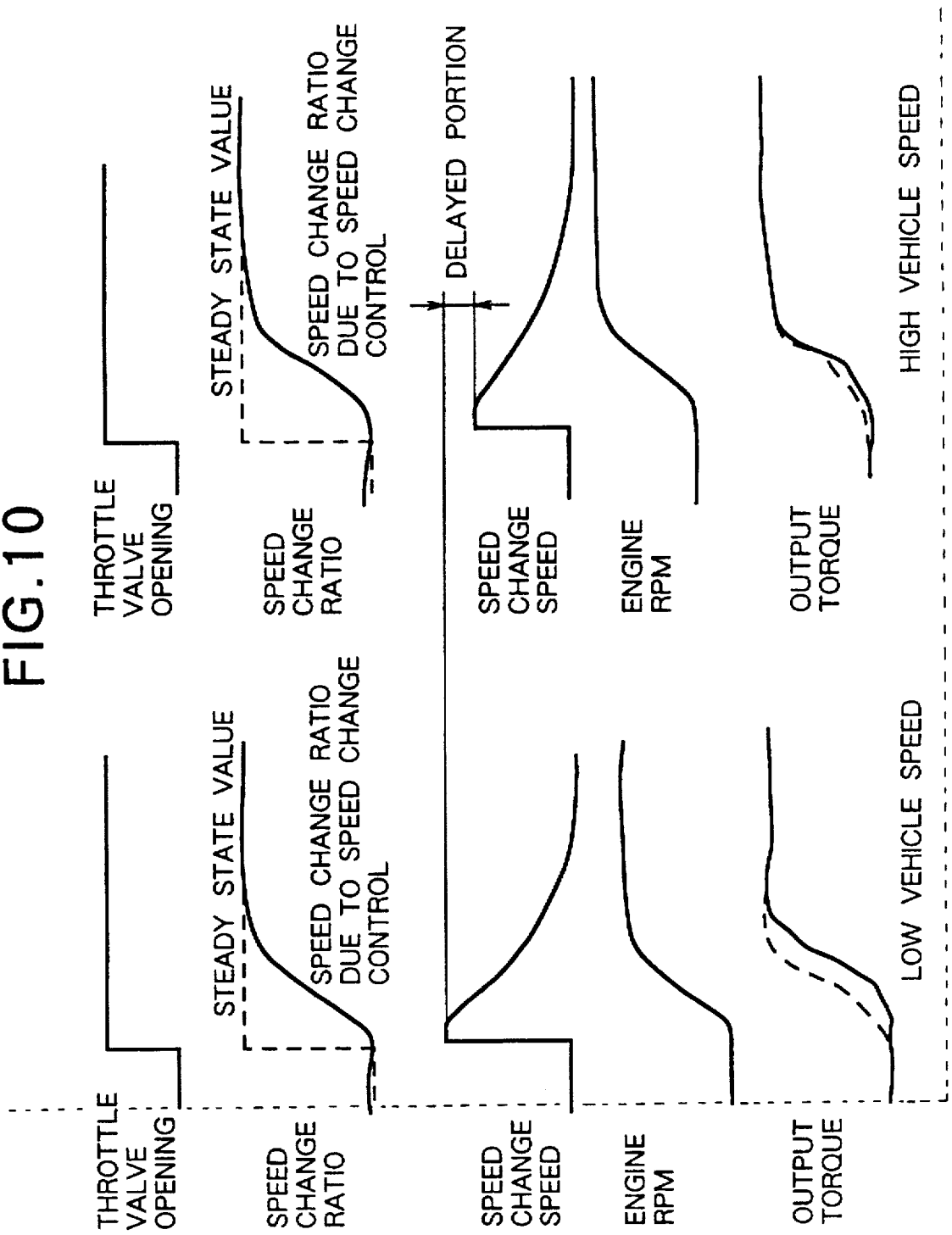
FIG. 10 is a time chart for explaining the results for the embodiment.

As a results of this control, as shown in FIG. 10 for the characteristics at the time of low vehicle speed and high vehicle speed, the speed change speed at the time of low vehicle speed and at the time of high vehicle speed is made different even for the same speed change ratio width, with the speed change speed becoming slower at the time of particularly high vehicle speed. Hence the inertia torque can be kept nearly constant. A reduction in output torque during speed change transition can therefore be avoided.

Figure 11:
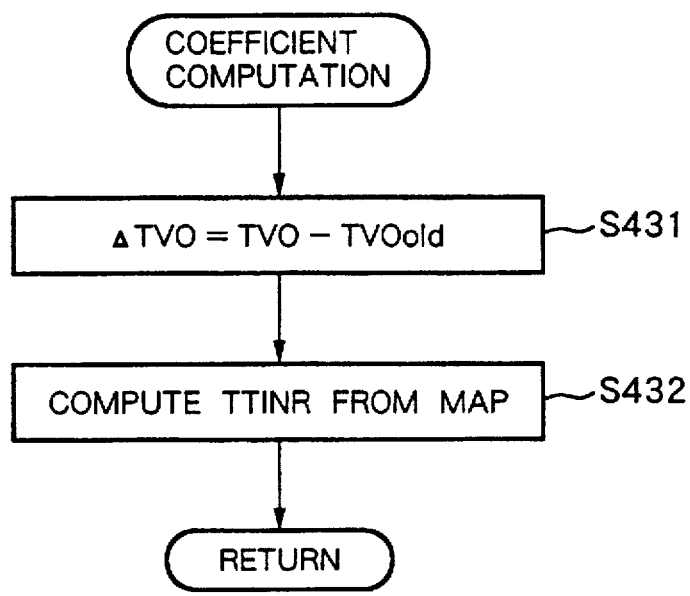
FIG. 11 is a flow char of a subroutine (4) used in coefficient computation.

FIG. 11 shows another example of a computation method for the coefficient TTINR.

In step 431, a throttle valve opening change rate ΔTVO (the absolute value of the change amount per unit time; the absolute value of the difference between the detected value TVO in the present routine and the detected value TVOold in the previous routine) is computed.

Then in step 432, the map corresponding to FIG. 8(C) is referred to and the coefficient TTINR for the throttle valve opening change rate ΔTVO is set.

The acceleration intention and the like of the driver can thus be reflected, even though this coefficient TTINR corresponding to throttle valve opening change rate ΔTVO is used.

With regards to the method of computing the coefficient TTINR, a method wherein this is set directly from the power POWER, the vehicle drive force $F_1$ the engine rotational speed $N_E$, the throttle valve opening TVO, the intake air flow rate Q, or the basic fuel injection quantity (corresponding to $Q/N_E$) an the like may be used instead of the method given for the abovementioned embodiment.

Figure 12:
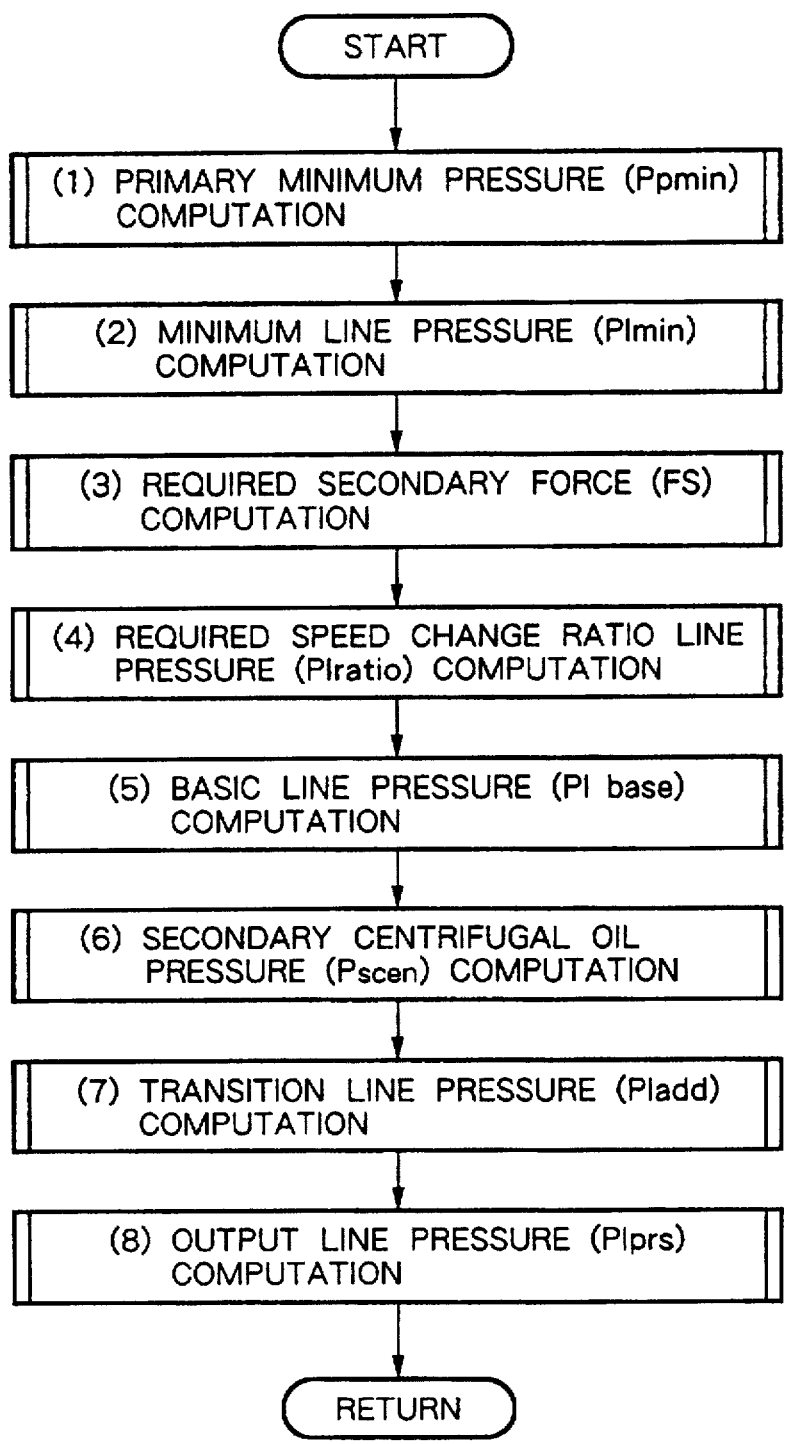
FIG. 12 is a flow chart showing a line pressure setting control routine in the embodiment.

With the controller 11 in the present embodiment, control of the speed change pressure and line pressure in the case of carrying out the abovementioned speed change control, is achieved by executing the flow chart shown in FIG. 12.

That is to say, in block (1) (with block denoted simply by (1), (2), (3) etc. in the figure), a minimum pressure (Ppmin) for the speed change pressure supplied to the primary pulley actuator 4a (speed change ratio control oil pressure chamber) is computed. That is to say, the necessary minimum pressure (Ppmin) for the speed change pressure which can achieve the target speed change ratio without slipping of the belt 6 is computed.

Basically, this is achieved by executing the flow chart of FIG. 13.

With this routine, in step 11, in order to obtain the necessary minimum primary pressure (Ppmin) of the speed change pressure matching with the actual speed change ratio (for example the indicated speed change ratio from the controller 11) and the engine torque, at first a magnification (θ1/θ) for the necessary minimum primary pressures (speed change pressure) for the respective speed change ratios is obtained for a speed change ratio=1, by referring to a map or the like wherein the magnifications are set based on a relationship between the engine torque (alternatively this can be the input torque to the continuously variable transmission 3) and the necessary minimum primary pressure. In the controller 11, a map wherein the speed change ratio is determined based on the vehicle speed VSP and the throttle valve opening TVO is referred to, and the speed change ratio then set for the current vehicle speed VSP and throttle valve opening TVO. Moreover, the speed change ratio can also be set so as to obtain the vehicle speed intended by the driver while maintaining a desired engine operating condition. In this case, since the engine operating conditions for good fuel consumption and exhaust gas properties can be maintained, then this can be advantageous with regards to fuel consumption and exhaust gas properties and the like.

Then in step 12, the minimum primary pressure (Ppmin) is obtained according to the following equation.

$$\text{Minimum primary pressure (Ppmin)} = \text{Engine torque} \times \theta \times \text{Magnification} + \text{Offset amount}$$

where the offset amount is a surplus amount.

In block (2) the minimum pressure (Plmin) of the line pressure supplied to the secondary pulley actuator 5a (tension control oil pressure chamber) is computed. That is to say, the necessary minimum pressure (Plmin) so that the belt 6 does not slip at the secondary pulley 5 side is computed.

Basically, this is achieved by executing the flow chart of FIG. 14.

With this routine, in step 21, in order to obtain the necessary minimum line pressure (Plmin) of the line pressure matching with the actual speed change ratio and the engine torque, the magnification (θ1/θ) for the necessary minimum line pressures for the respective speed change ratios is obtained for a speed change ratio=1, by referring to a map or the like wherein the magnifications are set based on the relationship between the engine torque $TQ_{ENG}$ (alternatively this can be the input torque to the continuously variable transmission 3) and the necessary minimum line pressure.

Then in step 22, the minimum line pressure (Plmin) is obtained according to the following equation.

$$\text{Minimum line pressure (Ppmin)} = \text{Engine torque} \times \theta \times \text{Magnification} + \text{Offset amount}$$

where the offset amount is a surplus amount.

In block (3) the calculation of the necessary force (FS) for the movable wall 5A of the secondary pulley actuator 5a is carried out.

That is to say, the required force (pressing force) on the movable wall 5A of the secondary pulley actuator 5a is determined so as to achieve a desired speed change ratio (secondary pulley effective diameter/primary pulley effective diameter=primary pulley rotational speed/secondary pulley rotational speed; referred to also as torque ratio) wherein slippage of the belt 6 on the primary pulley side does not occur. When the force (in other words the oil pressure) on one or other of the primary pulley actuator 4a or the secondary pulley actuator 5a is determined, then the force on the other can be logically determined from the relationship between the belt tension, the engine torque, and the torque ratio. Consequently, in order to obtain the desired speed change ratio, since the force (FP) on the primary pulley actuator 4a can be determined from the minimum primary/pressure (Ppmin) set by the solenoid valve 9 and the like, and the area of the primary pulley movable wall 4A, then the required secondary force (FS) in block (3) can be obtained based on this. Then in block (4), the required pressure for the secondary pulley side necessary to achieve the desired speed change ratio without slippage of the belt 6 on the primary pulley side is computed based on the required secondary force (FS).

Figure 15:
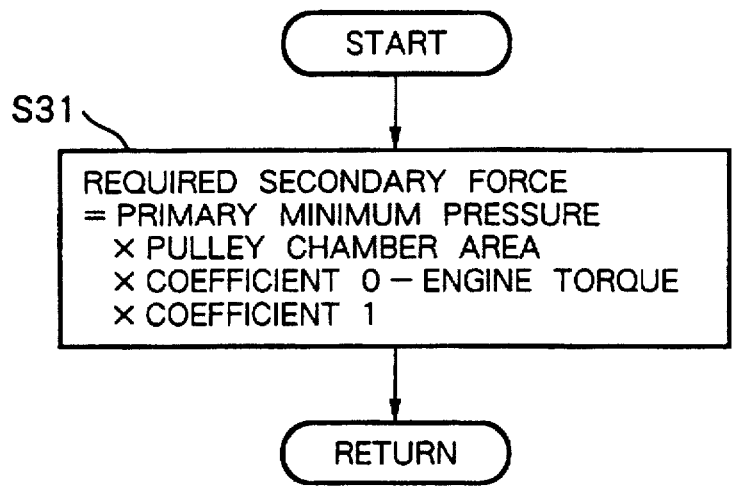
FIG. 15 is a flow chart for explaining block (3)

Basically, the require secondary force (FS) in block (3) is obtained by executing the flow chart of FIG. 15.

In step 31, the required secondary force (FS) is computed based on the following equation:

$$\text{Required second force (F)} = \text{Minimum primary pressure (Ppmin)} \times \text{Primary pulley movable 4A area} \times \text{Coefficient 0} - \text{Engine torque} \times \text{Coefficient 1}$$

where Coefficient 0 and Coefficient 1 are coefficients determined for the speed change ratio In block (4) calculation of the required speed change ratio line pressure (Plratio) is carried out based or the required secondary force FS obtained in block (3).

Figure 16:
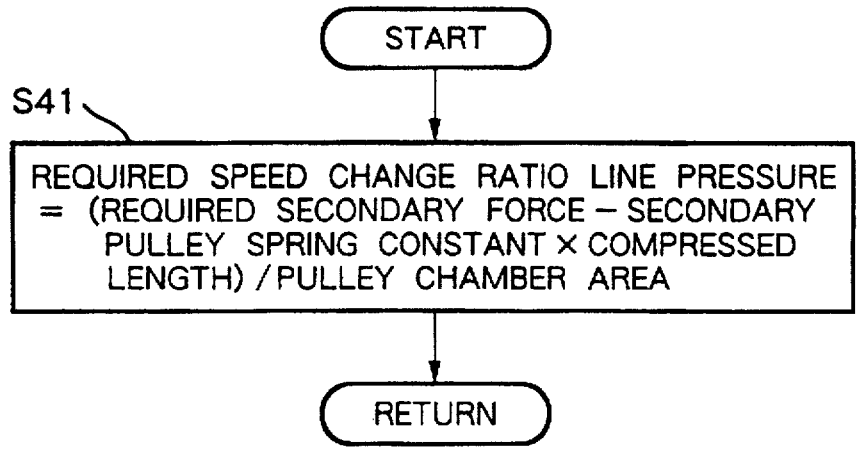
FIG. 16 is a flow chart for explaining block (4)

Basically, the required speed change ratio line pressure (Plratio) is obtained by executing the flow chart of FIG. 16.

With this routine, in step 41 the required speed change ratio line pressure (Plratio) is computed based on the following equation:

$$\text{Required speed change ratio line pressure (Plratio)} = \{\text{Required secondary force (FS)} - \text{Secondary pulley spring constant} \times \text{Compressed length}\} / \text{Movable wall 5A area}$$

The secondary pulley spring constant is the constant of a spring (not shown) used to force back the movable wall 5A in the secondary pulley actuator 5a, against the line pressure.

Computation of the basic line pressure (Pl base) is carried out in block (5).

In this computation, the line pressure (Plprs; described later) which finally acts on the secondary pulley actuator 5a, is determined based for example an the supply line pressure (basic line pressure Pl base), a secondary centrifugal oil pressure (Pscen; described later) which pushes in the direction of movement of the movable wall 5A caused by the centrifugal force of the oil confined inside the secondary pulley actuator 5a, the secondary pulley spring force, and a transition line pressure (Pl add; a line pressure which is temporarily increased by the line pressure control step or device of the present invention at the time of rapid speed change) for preventing slippage of the belt 6 at the time of speed change transition. Therefore at first, the basic line pressure (Pl base) is computed as a base for obtaining the final line pressure.

Figure 17:
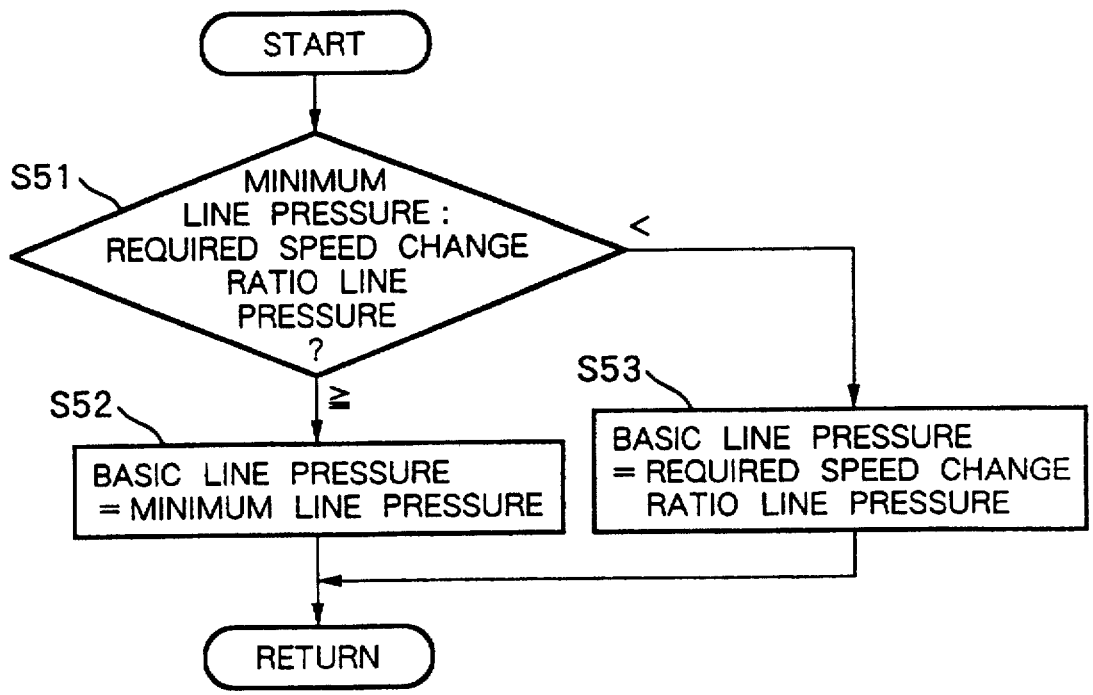
FIG. 17 is a flow chart for explaining block (5)

Basically, this involves execution of the flow chart of FIG. 17.

With this routine, in step 51 the minimum line pressure (Plmin) for non slippage of the belt 6, and the required speed change ratio line pressure (Plratio) for achieving the desired speed change ratio, are compared. When Minimum line pressure (Plmin)>Required speed change ratio line pressure (Plratio), control proceeds to step 52. On the other hand, when Minimum line pressure (Plmin)<Required speed change ratio line pressure (Plratio), control proceeds to step 53.

In step 52, the basic line pressure (Pl base) is made equal to the minimum line pressure (Plmin) in order to give priority to prevention of slippage of the belt 6, and the routine then terminated.

In step 53, since them is a surplus with respect to slippage of the belt 6, the basic line pressure (Pl base) is made equal to the required speed change ratio line pressure (Plratio), and the routine then terminated.

Computation of the secondary centrifugal oil pressure (Pscen) is carried out in block (6).

Figure 18:
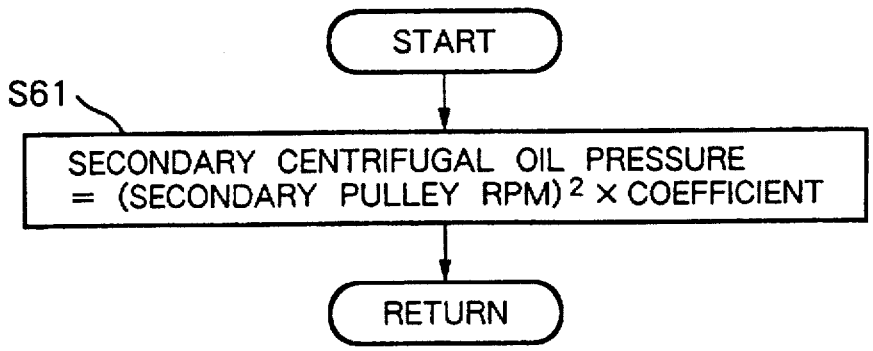
FIG. 18 is a flow chart for explaining block (6)

Basically, this involves execution of the flow chaff of FIG. 18.

With this routine, in step 61 the secondary centrifugal oil pressure (Pscen) is obtained according to the following equation:

Secondary centrifugal oil pressure (Pscen)=(Secondary pulley rotational speed)$^2$×Coefficient In block (7) the transition line pressure (Pl add) for preventing slippage of the belt 6 act the time of speed change transition, is determined.

Figures 19, 19A:
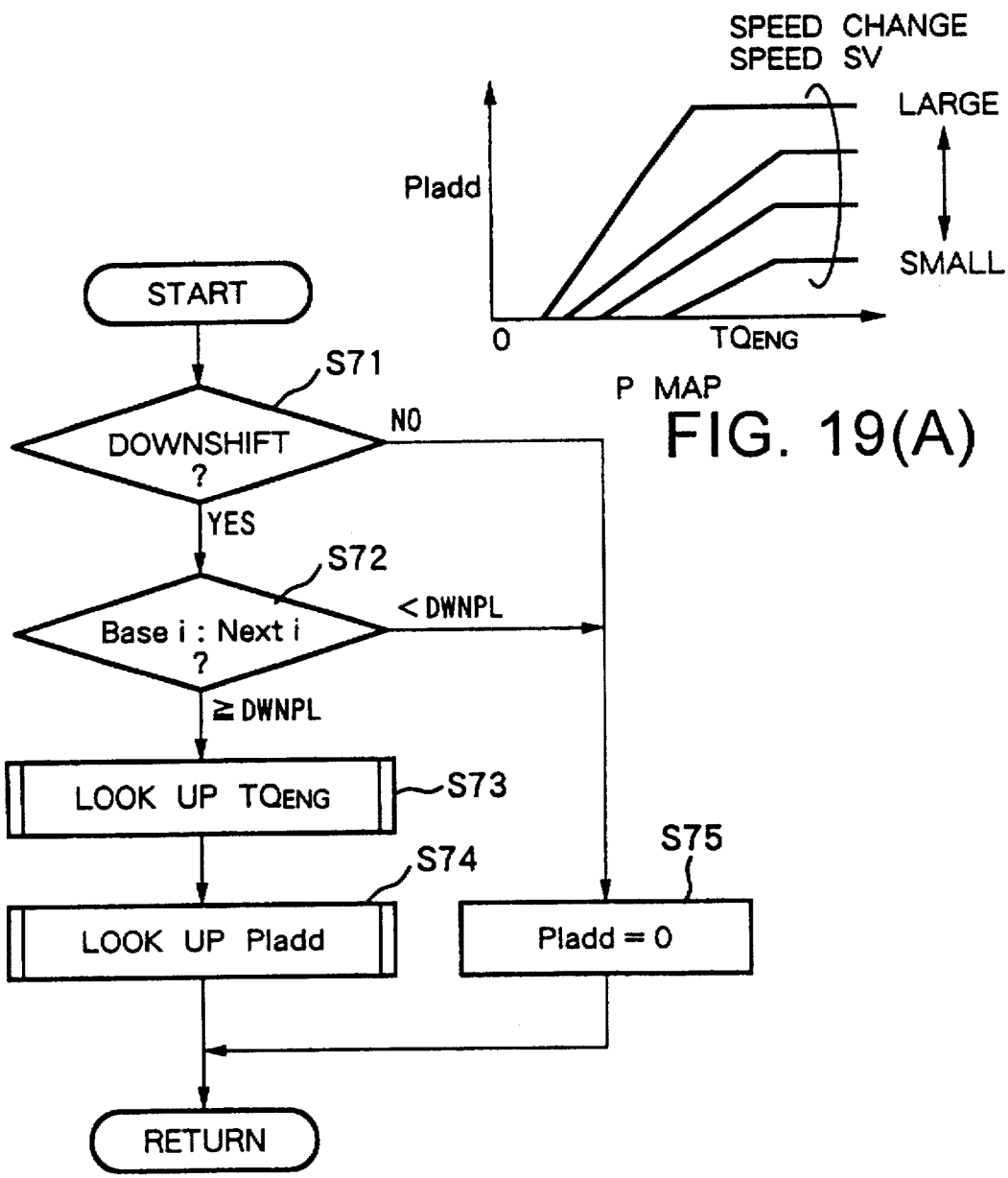
FIG. 19 is a flow chart for explaining block (7)
FIG. 19A is a map of relationships between "transition line pressure" (Pladd) and "engine torque" ($TQ_{ENG}$) at different values of "speed change" (SV)

More specifically, this is determined for example by execution of the flow chart of FIG. 19.

With this routine, in step 71 it is judged if there is downshift. This judgement can be made for example by comparing the final target speed change ratio Base i with the speed change ratio i (when the routine is started).

If there is downshift, control proceeds to step 72, while if not, it is considered that slippage of the belt 6 is unlikely even if transition correction is not carried out, and hence control proceeds to step 75 where the transition line pressure (Pl acid) is set to zero,and the routine then terminated.

In step 72, the final target speed change ratio Base i in the map 6 and a current set speed change ratio Next i are compared. If the difference (or ratio) is DWNPL or above, control proceeds to step 73 while if less than DWNPL it is considered that speed change adjustment has progressed (the speed change ratio has come close to the target speed change ratio) and the speed change speed is set relatively slow, and hence slippage of the belt 6 is unlikely even if transition correction is not carried out. Control thus proceeds to step 75 where the transition line pressure (Pl add) is set to zero, and the routine then terminated.

In step 73, a current TQ$_{ENG}$ is obtained from the engine rotational speed N$_E$ and throttle valve opening TVO by reference for example to a map.

In step 74, the map shown in the flow chart is referred to, and the transition line pressure (Pl add) for the speed change SV, set based on the engine torque TQ$_{ENG}$ at the current point in time, is obtained. That is to say, the transition line pressure (Pl add) for that point in time is retrieved based on a speed change speed SV map with the horizontal axis as engine torque TQ$_{ENG}$, and the vertical axis as transition line pressure (Pl add). In this way, the transition line pressure (Pl add) is set to a large value the larger the engine torque (the part corresponding to the first line pressure setting step or device of the present invention) or the faster the speed change speed SV (the part corresponding to the second line pressure setting step or device of the present invention). In other words, it is set to a value to correspond to the ease of slipping of the belt 6.

In block (8) computation of the final output line pressure (Plprs) is carried out. This is obtained based on the basic line pressure (Pl base) obtained in (5), the secondary centrifugal oil pressure (Pscen) obtained in (6), the transition line pressure (Pl add) obtained in (7), and the secondary pulley spring force and the like.

Basically this involves execution of the flow chart of FIG. 20.

With this routine, in step 81 the output line pressure (Plprs) is obtained according to the following equation;

Output line pressure (Plprs)={Basic line pressure (Pl base)+Transition line pressure (Pl add)−Secondary centrifugal oil pressure (Pscen)}×Margin With the margin, the secondary pulley spring force and the like is also considered well as a safely factor.

In step 82, an output line pressure (Plprs) and a limiter (LOW) (lower limit) are compared. The limiter (lower limit) may be set for each operating condition.

If Output line pressure (Plprs)<Limiter (LOW), control proceeds to step 83.

If Output line pressure (Plprs)≧Limiter (LOW), control skips step 83 to step 84.

In step 83, the output line pressure (Plprs) is set equal to the limiter (LOW). That is to say, it is set to a line pressure which is the minimum pressure (lower limit oil pressure) which can be supplied by the hydraulic circuit 8. In this way, the line pressure can be well maintained at a predetermined value. For example problems caused by the set pressure being too low, such as being unable to well maintain the line pressure (for example due to the occurrence of hunting and the like), or being unable to well realize the line pressure control function, can be eliminated. Moreover, it is also possible to prevent the occurrence of control degradation accompanying computational errors end the like.

In step 84, the output line pressure (Plprs) and a limiter (Hi) (upper limit) are compared. The limiter (HI) may be set for each operating condition.

If Output line pressure (Plprs)<Limiter (HI), step 85 is skipped and the routine terminated. That is to say, in this case, the computational results in step 81 are set as the final output line pressure (Plprs).

On the other hand, if Output line pressure (Plprs) ≧Limiter (HI), control proceeds to step 85.

In step 85, the output line pressure (Plprs) is set equal to the limiter (HI), and the routine terminated. That is to say, it is set to a line pressure which is the maximum pressure (upper limit oil pressure) which can be supplied by the hydraulic circuit 8. In this way; undesirable events such as an abnormal increase in friction (where this hinders rotation) or belt 6 damage due to an excessive increase in belt tension, damage to the secondary pulley actuator 5a or to the fine pressure supply path, and excessive operation of the oil pump, can be positively prevented. Moreover, the occurrence of poor control accompanying computational errors and the like can also be prevented.

In the case where the output line pressure (Plprs) obtained in this way is controlled by means of a flow control valve and the like incorporated in the hydraulic circuit 8, the pressure acting on the valve body of the flow control valve is adjusted for example by means of the solenoid valve 9 and the like or by switching the hydraulic pressure paths so as to give a flow rate for obtaining the output line pressure (Plprs), with adjustment being made by carrying out valve opening adjustment. That is to say, control substantially the same as for the conventional speed change pressure control can be carried out.

In the above manner, the necessary minimum line pressure (Plmin) for the non occurrence of slippage between the secondary pulley 5 and the belt 6 is computed, and also the required speed change ratio line pressure (Plratio) which can realize the target speed change ratio without slippage on the primary pulley side 4 is computed. The highest of these is then selected, and the final output line pressure (Plprs) obtained based on the selected line pressure. Since the obtained line pressure is supplied to the secondary pulley actuator 5a, then the slippage of the drive transmission member occurring in a case as with the conventional arrangement wherein only one of the drive side rotating member side and the driven side rotating member side is considered with no relationship therebetween can be reliably prevented, and the problem wherein the target speed change ratio (torque ratio) cannot be achieved, can be reliably solved. At the same time, since control to realize the target speed change ratio for non slippage on the primary pulley 4 side, is carried out on the secondary pulley actuator 5a side separate from the speed change ratio control, then in contrast to the case as with the conventional arrangement, wherein all of the control is born by the flow control valve used for speed change control, the construction can be significantly simplified.

Furthermore, with the present embodiment, at the time of speed change transition, the transition line pressure (Pl add) is increased to suppress slippage of the belt the larger the engine torque, or the faster the speed change speed, that is to say corresponding to the ease of slipping of the belt during speed change transition. Therefore belt slippage at the time of speed change transition can be positively prevented. Moreover, there is no reduction in belt life and the like (also no increase in rotation friction due to excessive tension), and it is possible to prevent a degradation in fuel consumption and the like by minimizing the unnecessary work of the oil pump.

Now with the present embodiment, at the time of adjusting the line pressure, the description has been given for carrying this out by means of a flow control valve and like incorporated in the hydraulic circuit 8. However the present invention is also applicable to the case wherein the solenoid valve 10 is omitted (since with the line pressure control it is not necessary to provid the complicated construction for speed change ratio control as with the primary side pulley), and instead of using a flow control valve, the line pressure control is carried out by pressure control valve which can directly control the hydraulic pressure, for example a duty control valve (a valve wherein pressure adjustment is possible by changing an open/close time proportion (duty ratio) for periodic opening/closing), by driving this with a duty signal from the controller 11.

Moreover, with regards to the speed change pressure and line pressure control of the present invention, description in the above embodiments has been given for an engine as the drive source. However the invention is also applicable to the case wherein other drive sources are used. Moreover, as well as being applied to vehicles, the present invention can also be applied to the case where optional rotational speed drive is taken off from drive sources in machines such as stationary type, industrial, and manufacturing machines.

What is claimed is:

1. A method of controlling a continuously variable transmission comprising a drive side rotating member which receives a rotation force from a drive source, a driven side rotating member, and a drive transmission member disposed therebetween for transmitting drive between both members, with a speed change ratio between said drive side rotating member and said driven side rotating member able to be steplessly set by steplessly changing a drive side contact radius (a distance of a contact position of said drive side rotating member and said drive transmission member from the rotation axis), and a driven side contact radius (a distance of a contact position of said driven side rotating member and said drive transmission member from the rotation axis) relative to each other, said method including the steps of:

in a rapid speed change line pressure control step, temporarily increasing a line pressure temporarily at a rapid speed change line pressure control step to press said driven side rotating member against said drive transmission member when a rapid speed change is detected, to thereby temporarily increase a contact pressure between said drive transmission member and said drive side rotating member or said driven side rotating member, so that slipping does not occur between said drive transmission member and said drive side rotating member or said driven side rotating member; and in a first pressure setting step, setting the line pressure controlled in said rapid speed change line pressure control step higher in accordance with an increase in the input torque which is input to said drive side rotating member.

2. A method of controlling a continuously variable transmission comprising a drive side rotating member which receives a rotation force from a drive source, a driven side rotating member, and a drive transmission member disposed therebetween for transmitting drive between both members, with a speed change ratio between said drive side rotating member and said driven side rotating member able to be steplessly set by steplessly changing a drive side contact radius (a distance of a contact position of said drive side rotating member and said drive transmission member from the rotation axis), and a driven side contact radius (a distance of contact position of said driven side rotating member and said drive transmission member from the rotation axis) relative to each other, said method including the steps of:

in a rapid speed change line pressure control step, temporarily increasing a line pressure temporarily at a rapid speed change line pressure control step to press said driven side rotating member against said drive transmission member when a rapid speed change is detected, to thereby temporarily increase a contact pressure between said drive transmission member and said drive side rotating member or said driven side rotating member, so that slipping does not occur between said drive transmission member and said drive side rotating member or said driven side rotating member; and in a second line pressure setting step, setting the line pressure controlled in said rapid speed change line pressure control step higher in accordance with an increase in the rate at which the speed changes.

3. The method of controlling a continuously variable transmission according to claim 1, further including:

a second line pressure setting step of setting the line pressure controlled in said rapid speed change line pressure control step higher in accordance with an increase in the rate at which the speed changes.

4. The method of controlling a continuously variable transmission according to claim 1, further including:

a speed change speed limit step of limiting the rate of change of speed to a value below or equal to a predetermined value when the resultant output line pressure from said rapid speed change line pressure control step is equal to or above a predetermined value, by controlling the relative change speed of said drive side contact radius and said driven side contact radius.

5. The method of controlling a continuously variable transmission according to claim 2, further including:

a speed change speed limit step of limiting the rate of change of speed to a value below or equal to a predetermined value when the resultant output line pressure from said rapid speed change line pressure control step is equal to or above a predetermined value, by controlling the relative change speed of said drive side contact radius and said driven side contact radius.

6. The method of controlling a continuously variable transmission according to claim 1, wherein:

said drive side rotating member is a first pulley with a changeable effective first wrapping diameter, said driven side rotating member is a second pulley with a changeable effective second wrapping diameter, and said drive transmission member is a wrapping type transmission medium for wrapping around the first and second pulleys.

7. The method of controlling a continuously variable transmission according to claim 2, wherein:

said drive side rotating member is a first pulley with a changeable effective first wrapping diameter, said driven side rotating member is a second pulley with a changeable effective second wrapping diameter, and said drive transmission member is a wrapping type transmission medium for wrapping around the first and second pulleys.

8. An apparatus for controlling a continuously variable transmission comprising a drive side rotating member which receives a rotation force from a drive source, a driven side rotating member, and a drive transmission member disposed therebetween for transmitting drive between both members with a speed change ratio between said drive aide rotating member and said driven side rotating member able to be steplessly set by steplessly changing a drive side contact radius (a distance of a contact position of said drive side rotating member and said drive transmission member from the rotation axis), and a driven side contact radius (a distance of a contact position at said driven side rotating member and said drive transmission member from the rotation axis) relative to each other, said apparatus including:

rapid speed change line pressure control means for temporarily increasing a line pressure which presses said driven side rotating member against said drive transmission member when a rapid speed change is detected so as to temporarily increase a contact pressure between said drive transmission member and said drive side rotating member or said driven side rotating member, so that slipping does not occur between said drive transmission member and said drive side rotating member or said driven side rotating member; and first line pressure setting means for setting the line pressure controlled by said rapid speed change line pressure control means higher the input torque which is input to said drive side rotating member.

9. An apparatus for controlling a continuously variable transmission comprising a drive side rotating member which receives a rotation force from a drive source, a driven side rotating member, and a drive transmission member disposed therebetween for transmitting drive between both members, with a speed change ratio between said drive side rotating member and said driven side rotating member able to be steplessly set by steplessly changing a drive side contact radius (a distance of a contact position of said drive side rotating member and said drive transmission member from the rotation axis), and a driven side contact radius (a distance at a contact position of said driven side rotating member and said drive transmission member from the rotation axis) relative to each other, said apparatus including:

rapid speed change line pressure control means for temporarily increasing a line pressure which presses said driven side rotating member against said drive transmission member when a rapid speed change is detected, so as to temporarily increase a contact pressure between said drive transmission member and said drive side rotating member or said driven side rotating member, so that slipping does not occur between said drive transmission member and said drive side rotating member or said driven side rotating member; and second line pressure setting means for setting the line pressure controlled by said rapid speed change line pressure control means higher the faster the speed change speed.

10. The apparatus for controlling a continuously variable transmission according to claim 6, including: second line pressure setting means for setting the line pressure controlled by said rapid speed change line pressure control means higher the faster the speed change speed.

11. The apparatus for controlling a continuously variable transmission according to claim 8, including: speed change speed limit means for limiting the speed change speed to below or equal to a predetermined value when the resultant output line pressure from said rapid speed change fine pressure control means is equal to or above a predetermined value, by controlling the relative change speed of said drive side contact radius and said driven side contact radius.

12. The apparatus for controlling a continuously variable transmission according to claim 9, including: speed change speed limit means for limiting the speed change speed to below or equal to a predetermined value when the resultant output line pressure from said rapid speed change fine pressure control means is equal to or above a predetermined value, by controlling the relative change speed of said drive side contact radius and said driven side contact radius.

13. The apparatus for controlling a continuously variable transmission according to claim 8, wherein: said drive side rotating member is a pulley with a changeable effective wrapping diameter, said driven side rotating member is a pulley with a changeable effective wrapping diameter, and said drive transmission member is a wrapping type transmission medium for wrapping around these.

14. The apparatus for controlling a continuously variable transmission according to claim 9, wherein said drive side rotating member is a pulley with a changeable effective wrapping diameter, said driven side rotating member is a pulley with a changeable effective wrapping diameter, and said drive transmission member is a wrapping type transmission medium for wrapping around these.

* * * * *